United States Patent
Lee et al.

(10) Patent No.: US 9,906,727 B2
(45) Date of Patent: Feb. 27, 2018

(54) METHOD FOR PROVIDING A TITLE OF CONTENTS BASED ON CONTEXT AWARENESS AND DEVICE THEREOF

(71) Applicant: Samsung Electronics Co., Ltd., Gyeonggi-do (KR)

(72) Inventors: Chihoon Lee, Seoul (KR); Sanghyuk Ko, Jeju-do (KR); Taeyeon Kim, Seoul (KR); Jihye Myung, Gyeonggi-do (KR); Hyunmi Park, Seoul (KR); Hyemi Lee, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 223 days.

(21) Appl. No.: 14/010,977

(22) Filed: Aug. 27, 2013

(65) Prior Publication Data

US 2014/0063315 A1 Mar. 6, 2014

(30) Foreign Application Priority Data

Aug. 28, 2012 (KR) .......................... 10-2012-0094032

(51) Int. Cl.
| H04N 5/232 | (2006.01) |
| G06F 17/30 | (2006.01) |
| H04W 4/12 | (2009.01) |

(52) U.S. Cl.
CPC .... H04N 5/23293 (2013.01); G06F 17/30265 (2013.01); H04N 2201/3253 (2013.01); H04W 4/12 (2013.01)

(58) Field of Classification Search
CPC ............. H04N 1/2129; H04N 5/23293; H04N 2201/3226; H04N 2201/3253; H04N 21/8547; G06F 17/30265; H04W 4/12

USPC .......................................... 348/333.02, 231.5
See application file for complete search history.

(56) References Cited

U.S. PATENT DOCUMENTS

| 6,040,825 | A | 3/2000 | Yamamoto et al. |
| 6,657,661 | B1 | 12/2003 | Cazier |
| 2003/0033296 | A1 | 2/2003 | Rothmuller et al. |
| 2006/0291818 | A1* | 12/2006 | Lee ........................ G11B 27/34 386/219 |
| 2010/0260421 | A1 | 10/2010 | Park et al. |
| 2011/0081952 | A1* | 4/2011 | Song .................. H04N 1/00307 455/566 |
| 2011/0199510 | A1* | 8/2011 | Ono et al. .................. 348/231.5 |
| 2012/0052880 | A1* | 3/2012 | Hymel .................. H04W 4/206 455/456.3 |
| 2012/0098999 | A1* | 4/2012 | Chen .................... H04N 1/3871 348/231.5 |

(Continued)

FOREIGN PATENT DOCUMENTS

KR    10-2011-0036464 A    4/2011

OTHER PUBLICATIONS

I phone User Guide for ios 4.2 and 4.3 Softwarer, © 2011.*

Primary Examiner — Ahmed A Berhan
(74) Attorney, Agent, or Firm — Cha & Reiter, LLC.

(57) ABSTRACT

A method for providing a content title of a portable terminal includes: displaying a particular content on the display; extracting context tag information corresponding to the particular content; generating the contents title according to a predetermined format based on the extracted context tag information; and displaying the content title and the particular content.

19 Claims, 8 Drawing Sheets

(56) References Cited

U.S. PATENT DOCUMENTS

2012/0242599 A1* 9/2012 Seo et al. ...................... 345/173

* cited by examiner

METHOD FOR PROVIDING A TITLE OF CONTENTS BASED ON CONTEXT AWARENESS AND DEVICE THEREOF

CLAIM OF PRIORITY

This application claims the benefit under 35 U.S.C. § 119(a) of a Korean patent application filed on Aug. 28, 2012 in the Korean Intellectual Property Office and assigned Serial No. 10-2012-0094032, the entire disclosure of which is hereby incorporated by reference.

BACKGROUND

Field of the Invention

The present disclosure relates to a method and an apparatus for providing a title of contents, and more particularly, to a method and an apparatus for displaying a content title for better recognize the content being replayed.

Description of the Related Art

A portable communication device, such as a smart phone and a table PC has been very popular as it provides a variety of services and function. It now has developed into a multimedia device in which a phone book, a game, an email, a morning call, a music player, a scheduling function, a digital camera, and a wireless internet services are available.

The portable terminal generates many various contents such as a voice, a video, an audio, and a text. When generating these contents using the portable terminal, the generated contents are automatically assigned to a date and a specific reference number. For example, when take a photo using a camera in the portable terminal, the title of a photo file is provided as a file name such as a photo taken date and a specific number. Hence, there is no way for a user to know about the information of when and where the photo has been taken.

That is, in the related art, a system generates a file name of the contents automatically without considering a context of the portable terminal, thus, with a title only, the user has a difficulty to identify where and how the content was generated.

SUMMARY

The present invention has been made in view of the above problems and provides additional advantages, by providing a method and an apparatus for recognizing context of a user at the time the contents is generated or a context of the portable terminal, and then displays a title based on the context information when the contents is generated.

In accordance with an aspect of the present invention, a method of providing a contents title of a portable terminal includes: displaying a particular content on the display; extracting context tag information corresponding to the particular content; generating the contents title according to a predetermined format based on the extracted context tag information; and displaying the content title and the particular content.

In accordance with another aspect of the present invention, a portable terminal providing a contents title includes: a touch screen for displaying a particular content; a controller which controls to collect at least one context information related to the displayed particular content, generate context tag information based on the collected context information, generate a contents title according to a predetermined format based on the generated content tag information, and display the generated content title and the particular content.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A terminology 'contents' in the present invention refers to a data or media content which may generate a title among the data or media content generated by executing a specific function or application of a communication device. Such contents may include a text, an image, a video, and an audio, etc., however, is not limited thereto.

A 'context information' in the present invention refers to the information being collected at the time when the contents are generated by the communication device. The context information may include a position information, a time information, a member information, a weather information, and an event information, however, is not limited thereto. In detail, the position information refers to the information related to position at the time the contents is generated, downloaded or uploaded. For example, the position information may include an address information by converting a GPS location coordinate at the time the contents is generated. The time information refers to the time information at the time the contents are stored. The time information may include the date information such as a year, a month, and a day, and the time information such as an hour, a minute, and a second. The weather information refers to the weather information from the current position at the time the contents are stored. The member information refers to the information about a member related to the contents. For example, the member information may include a member's name etc. The event information refers to the event information stored in a scheduler at the time the contents are stored by interworking with the scheduler.

The 'context tag information' of the present invention refers to the tag information generated based on the context information which is collected at the time the contents are generated by the communication device. The context tag information may include a position tag, a time tag, a member tag, a weather tag, and an event tag, however, is not limited thereto.

The method and the apparatus for providing the contents title according to the present invention may be applied to the portable terminal or any duplex system such as a portable phone, a smart phone, a tablet PC, a hand-held PC, a Portable Multimedia Player (PMP), and a Personal Digital Assistant (PDA) etc. Hereinafter, it is assumed that a message management method and an apparatus according to the present invention are applied to the portable terminal.

Figure 1:
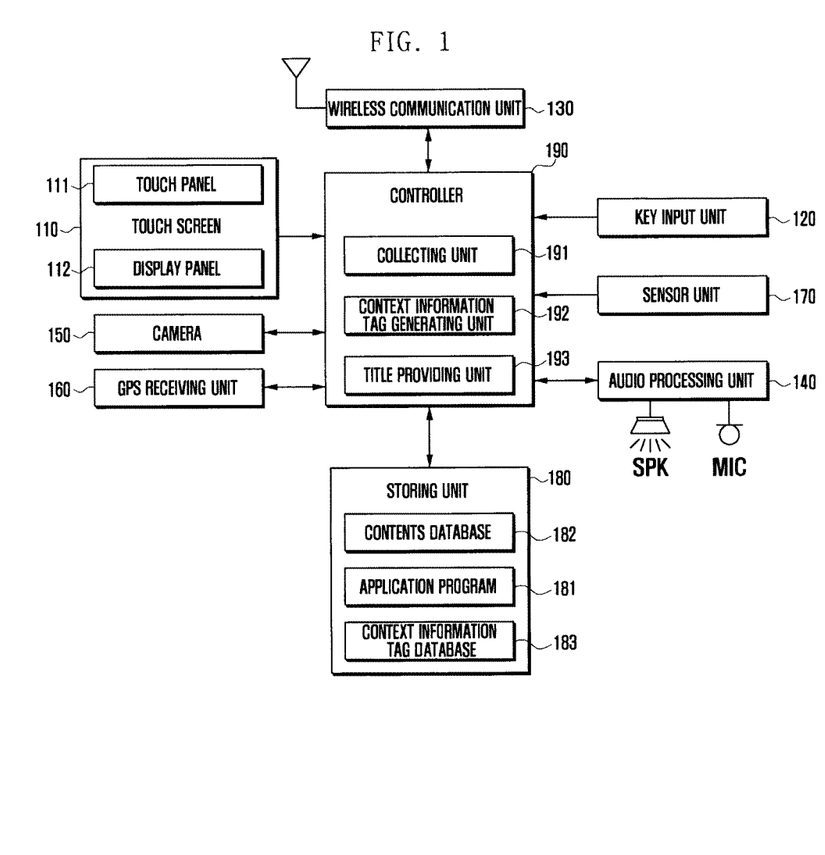
FIG. 1 is a configuration view illustrating a portable terminal according to the present invention.

FIG. 1 is a configuration view illustrating a portable terminal according to the present invention.

Referring to FIG. 1, the portable terminal 100 according to the present invention may include a touch screen 110 which is configured by including a touch panel 111 and a display panel 112, and a key input unit 120, a wireless communication unit 130, an audio processing unit 140, a camera 150, a GPS receiving unit 160, a sensor unit 170, a storing unit 180 and a controller 190.

The touch screen 110 may generate a touch event which is responsive to the user input information (for example, a user gesture) and delivers to the controller 190. The controller 190 may detect the user gesture from the touch event. The controller 190 may execute the function of the portable terminal 100 in response to the detected user gesture.

Here, the user gesture is divided into a touch and a touch gesture. Here, the touch refers to an operation of a user to touch a certain point of a screen by using a touch input tool (for example, a finger or a stylus pen), the tap refers to a touch and release operation in which a certain point is touched and the touch input tool releases the touch from a corresponding point without movement of the touch input tool, the double tap refers to an operation of tapping twice on a certain point sequentially, the long tap refers to an operation in which a touch is performed relatively longer than the tap and the touch input tool releases the touch at a corresponding point without movement of the touch input tool, the drag refers to an operation of moving the touch input tool in a predetermined direction in a state where a certain point is touched, the drag and drop refers to an operation in which the touch input tool release a touch after the drag, and the flick refers to an operation of releasing a touch as bouncing after moving the touch input tool relatively faster than the drag. The press refers to an operation of pressing a corresponding point after touching a certain point with the touch input tool. Further, the touch gesture may include a tap, a double tab, a long tap, a drag, a drag and drop, a flick, and a press, etc. In other words, the touch refers to a state of contacting the touch screen 110 and the touch gesture refers to a movement of the touch from contacting (touch-on) the screen and releasing the touch (touch-off).

The touch panel 111 may be implemented as an add-on type which is disposed on the display panel 112, or an on-cell type or an in-cell type which is inserting into the display panel. A resistive type, a capacitive type, and an electromagnetic induction type may be applied to the touch panel 111.

The display panel 112 may display an image data input by the controller after converting into an analog signal under the control of the controller 190. In other words, the display panel 112 may provide many various screens according to the use of the portable terminal, for example, a lock screen, a home screen, an application (hereinafter, "App") execution screen, a menu screen, a keypad screen, a message writing screen, and an internet screen etc. The lock screen may be defined as an image being displayed when the screen of the display panel 112 is turned on. When a specific touch event for releasing the lock is generated, the controller 190 may convert the displaying image to the home screen or the App execution screen from the lock screen. The home screen may be defined as the image which includes a plurality of App icons corresponding to a plurality of Apps, respectively. When any one of a plurality of app icons is selected by the user, the controller 190 executes a corresponding App and may display the execution screen. The display panel 112 may be formed as a type of a flat display panel such as a Liquid Crystal Display (LCD), an Organic Light Emitted Diode (OLED), and an Active Matrix Organic Light Emitted Diode (AMOLED).

The key input unit 120 receives an input of a number or character information, and may include a plurality of input keys and function keys in order to configure the various functions. The function keys may include an arrow key, a side key, and a control key which are configured to perform the specific functions. In addition, after generating a key signal related to a user setting and a function control of the portable terminal 100, the key input unit 120 may deliver the signal to the controller 190. The key signal may be divided into a power on/off signal, a volume control signal, and a screen on/off signal. The controller 190 may control these configurations in response to such key signals. In addition, the key input unit 120 may include a qwerty keypad which includes a plurality of keys, a 3*4 keypad, and a 4*3 keypad. Also, when the touch panel 111 of the portable terminal 100 is supported as a full touch screen type, the key input unit 120 may include at least only one side key for the screen on/off and the portable terminal on/off, which are formed in the case side of the portable terminal 100.

The wireless communication unit 130 may perform the transmitting and receiving of contents and the context information related to the contents by forming a communication channel with a wireless communication network under the control of the controller 190. The wireless communication unit 130 may download the contents, and may deliver an update request signal. The wireless communication unit 130 may transmit the contents update request signal to the controller 190. The controller 190 may control the display panel 112 to output the received contents information to the display panel 112.

The wireless communication unit 130 may access to the specific server in order to collect the context information related to the contents under the control of the controller 190. The wireless communication unit 130 may receive the time information, the weather information, and the position information by accessing to the specific server under the control of the controller 190. The wireless communication unit 130 may deliver the received context information to the controller 190.

The wireless communication unit 130 may include a radio frequency transmission unit which performs up conversion and amplification of the frequency of the transmitting signal, and a radio frequency receiving unit which performs low noise amplification and down conversion of a receiving signal. In addition, the wireless communication unit 130 may include a mobile communication module (for example, 3-Generation mobile communication module, a 3.5-Generation mobile communication module, or a 4-Generation mobile communication module), and a digital broadcasting module (for example, DMB module).

The audio processing unit 140 may transmit an audio data such as a voice input by the controller 190 to the speaker (SPK) by performing a Digital to Analog (DA) conversion. The audio processing unit 140 may transmit the audio data such as a voice input by a microphone (MIC) to the controller by performing an Analog to Digital (AD) conversion.

The camera 150 is activated by the input signal generating by the touch screen 110 or the key input unit 120 to photograph a photo and an image and may deliver the photographed photo and image to the controller 190 under the control of the controller 190. In other words, the camera 150 photographs the photo and the image in response to the input signal under the control of the controller 190. The camera 150 converts the photographed photo and the image into a digital data. The camera 150 delivers the photo and image information which have converted to the digital data to the controller 190. The controller 190 outputs the transmitted photo and image signal to the display panel 112. The camera 150 may include a lens which collects the light, a camera sensor which converts the collected lights to an electrical signal, a video processing device which converts the analog video signal to the digital video signal, and a signal processing device which processes the video signal in order to display the video signal output by the video processing device to the display panel 112.

The Global Positioning System (GPS) receiving unit 160 receives a GPS satellite signal from a GSP satellite and may deliver to the controller 190. In other words, the GPS receiving unit 160 receives the satellite receiving signal from the controller 190 at the time the contents are stored by generating, downloading, and updating of the contents. The GPS receiving unit 160 may receive the GPS satellite signal by accessing to the GPS satellite. The GPS receiving unit 160 delivers the received GPS satellite signal to the controller 190. The controller 190 calculates the position coordinate(s) of the current position of the portable terminal by using the GPS satellite signal, and may extract the address information from the position coordinates. The controller 190 may receive the address information corresponding to the position coordinates by accessing to a specific server through the wireless communication unit 130.

The sensor unit 170 detects a state or a surrounding environments change of the portable terminal 100 and may deliver the information thereof to the controller 190. The sensor unit 170 of the present invention may include various sensors, for example, a temperature sensor which may detect a surrounding temperature of the portable terminal 100, a humidity sensor which may detect a surrounding humidity of the portable terminal 100, a direction sensor which may detect a direction, and an acceleration sensor, an illumination sensor and a gyro sensor which may detect a movement direction of the portable terminal 100.

The sensor unit 170 according to an exemplary embodiment of the present invention detects the state and the surrounding environments change of the portable terminal 100 at the time the contents are generated, displayed, downloaded, and updated. The sensor unit 170 delivers the detected environment information to the controller 190. The controller 190 obtains information relating to an external environment, for example, the weather information, however, is not limited thereto. To this end, the controller 190 may collect the weather information where the portable terminal is positioned through the sensor unit 170, however may receive the weather information where the portable terminal is positioned by accessing a specific server.

The storing unit 180 may include an application program area 181, a contents database (DB) 182, and a context tag information database (DB) 183.

The application program area 181 stores an operating system (OS) to boot up the portable terminal, and the application program which is necessary to a call function, a video or a music replay function, an image display function, and a camera photograph function. In addition, the application program which is necessary to a broadcast watching function, an audio recording function, a calculation function, a scheduling management function may be stored in the program area. Also, a travel application program, a weather application program, and an image recognition program which extracts a member or person's information from an image data may be included in the application program area according to the present invention.

The contents database 182 stores the contents which are generated, downloaded, and updated in the portable terminal under the control of the controller 190. The contents database 182 according to the present invention may store the contents related to the various functions providing by the portable terminal, for example, an image file, a video file, an audio file, and a text file. The contents database 182 according to the present invention may store the contents related to the context tag information based on the context information of the contents stored time under the control of the controller 190. In order words, the contents stored in the contents database 182 may be related to the at least one context tag information of a position tag, a member tag, a weather tag, an event tag, and a date tag.

The context tag information database 183 may store the context tag information based on the context information at the time the contents are generated, displayed, downloaded, or updated. Such context tag information may include at least one of the position tag, the member tag, the weather tag, the event tag, and the date tag, however, is not limited thereto.

The controller 190 controls an overall operation of the portable terminal 100 and a signal flow between the internal configurations of the portable terminal 100, and performs a data processing function. The controller 190 controls the power supply from a battery to the internal configurations. When the power is supplied, the controller 190 controls a booting procedure of the portable terminal 100, and executes various application programs stored in the program area in order to execute the function of the portable terminal 100 according to the user's setting.

According to the present invention, the controller 190 may include a collecting unit 191, a context tag information generating unit 192, and a title providing unit 193.

When the contents are generated, displayed, uploaded, and downloaded to be stored, the collecting unit 191 may perform the function of collecting the context information which is related to the corresponding contents. Here, the context information may include the position information, the date information, the weather information, the member information, and the event information. The collecting unit 191 may collect the context information by controlling the collecting modules, which can collect the context information, such as the wireless communication unit 130, the sensor unit 170, the camera 150, the key input unit 120, the touch screen 110, and the GPS receiving unit 160.

In detail, the collecting unit 191 calculates the position coordinate in which the portable terminal is positioned at the time of an image contents are stored by receiving the GPS satellite signal through the GPS receiving unit at the time the contents are stored.

The collecting unit 191 collects the weather information and the time information at the time the contents are stored. The collecting unit 1981 may collect by receiving the time information and the date information from the application program displaying the time information. The collecting unit 191 may collect by receiving the current time information from a specific server, for example a base station through the wireless communication network.

The collecting unit 191 may collect by receiving the current weather information from the specific server, for example, the server for providing the weather information through the wireless communication network. In addition, the collecting unit 191 collects the surrounding temperature information and the surrounding humidity information by using the sensor unit, and may collect the weather information based on the collected information. For example, the collecting unit 191 may detect the surrounding temperature and the humidity of the portable terminal by activating the temperature sensor and the humidity sensor. The collecting unit 191 predicts the external environment by using the detected temperature and the humidity, and may determine the weather information of the corresponding contents by the predicted information.

When the contents are generated, displayed, downloaded, and/or updated, the collecting unit 191 may collect the person information related to the contents. For example, when a person is included to the image contents, the collecting unit 191 may identify the corresponding person by executing the image recognition program. After recognizing a contour (outline) of the person from the image contents, the image recognition program verifies the position of an eye, a chin, and a mouth on the face, and may identify the corresponding person by comparing the recognized face in a phone book data. In addition the collecting unit 191 may collect various person information through the tag information associated with the image content.

The collecting unit 191 verifies whether there is any event stored in the schedule application at the time the contents are stored, and may collect the event information when the event exists at the time the content is generated or displayed in the display unit.

The collecting unit 191 may only collect the information which is collectable among the context information described above. In other words, the collecting unit 191 may collect at least one of the position information, the date information, the time information, the member information, and the event information. The context information according to the present invention is not limited to the information collection described above, however, all information which can determine the context of the contents generating by the portable terminal may be the context information.

When the context information is collected, the context tag information generating unit 192 may generate the context tag information based on the context information. The context tag information generating unit 192 may control to store the context tag information into a context tag information database by relating to the tag info to the contents.

The context tag information generating unit 192 may generate the context tag information based on the context information as illustrated in the following table 1. Table 1 is only one of examples to explain the present invention, and is not limited thereto.

TABLE 1

| Tag Type | Description | Remarks |
| --- | --- | --- |
| Time tag | time information tag at the time contents are stored ex)05/06/2012 13:31 | Basic tag |
| Position Tag | Address information tag which converted the GPS position coordinate at the time contents are stored to the address information ex) Austin Texas 78741 US | Basic tag |
| Weather tag | The weather information tag at the time contents are stored ex) Sunny, Cloudy, Rainy, Snowy, Clear | Basic tag |
| Member tag | Member information tag included to the image contents ex) katie, tom anderson | Image contents additional tag |
| Event tag | Event information tag stored in the schedule application at the time contents are stored ex) the 11th anniversary, drum lesson | Time and position considering tag |

The context tag information generating unit 192 may generate only the context tag information based on the collected contexts information. The context tag information generating unit 192 may store the generated context tag information associated with the contents.

The title providing unit 193 may generate the contents title which is based on the context tag information. The title providing unit 193 may generate the content title in a predefined format based on the generated context tag information.

That is, the title providing unit 193 may provide the content title to the display panel based on a preset rule or format. Further, the title providing unit 193 can further adjust the content title by manipulating the user interface provided in the display panel. Alternatively, the user configures the content title according to his or her preferences using the content tag information retrieved during a subsequent relay. When an input field which matches to the context tag information exists, the title providing unit 193 may display by providing the context tag information that matches to the input field. The present invention collects the context information from the portable terminal and may generate the context tag information based on the collected context information. A detailed operation will be described in more details later with references to FIGS. 5 through 8.

It should be noted that not all components of the terminal may be mentioned herein as the components may be modified in various manners according to a convergence trend of a digital device. However, the portable terminal 100 according to the present invention may further include the elements which are not mentioned above, such as a sensor module for detecting the information related to the position change of the portable terminal 100, a GPS module for measuring the position of the portable terminal 100, and a camera module. In addition, in the portable terminal 100 of the present invention, specific elements may be excluded from the above-mentioned configuration or may be substituted by other elements. Also, the input unit of the present invention may be a touch pad and a track ball in addition to the touch screen 110 and the key input unit 120.

Figure 2:
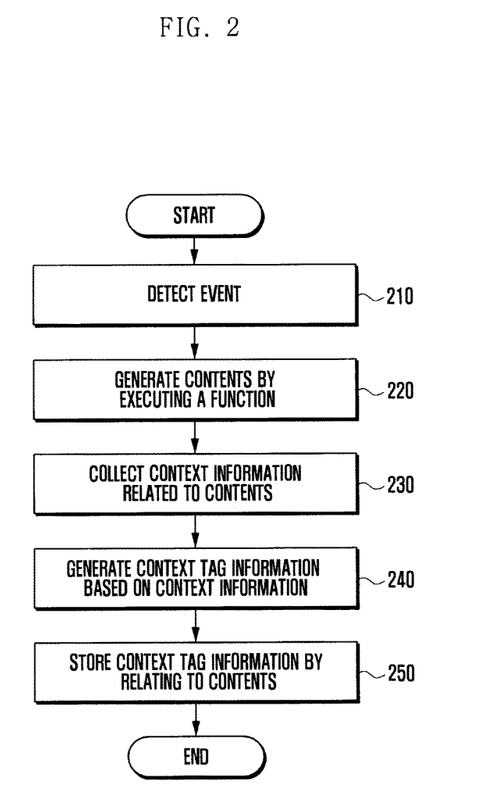
FIG. 2 is a view illustrating a storing method of a portable terminal according to the present invention.

FIG. 2 illustrates the contents storing method of the portable terminal according to the present invention.

Referring to FIG. 2, the controller 190 detects an event generated in the portable terminal (210). The controller 190 generates the contents by executing a function of the portable terminal 100 in response to the event (220). As the function of the portable terminal 100, the function related to the contents generation, display, replay, a download and an update may be executed. Here, the contents may include a text, an image, a video or an audio, however, is not limited thereto.

The controller 190 collects the context information related to the contents generation in the portable terminal 100 (230). Here, the context information is the information which may be collectable from the portable terminal 100 at the time the contents are stored and may include a position information, a time information, a member information, a weather information, and an event information. Such context information may be collected through the touch screen 110, the key input unit 120, the wireless communication unit 130, the camera 150, the GPS receiving unit 160, and the sensor unit 170 of the portable terminal under the control of the controller 190.

For example, when the user photographs the image by executing the camera function 150 in the portable terminal 100, the image contents are generated. Then, the controller 190 executes the function for collecting the context information related to the image contents. The controller 190 collects the time information in the point of time when the image contents are captured through the wireless communication unit 130. The controller 190 calculates the position coordinate by receiving the GPS satellite signal, and collects the address information by using the position coordinate. The controller 190 checks the weather information by collecting the surrounding environment information through the sensor unit 170 or, collects the weather information received externally from another source by the wireless communication unit 130. In addition, the controller 190 extracts an individual from the image contents, and may identify the person by searching the contact information from a phone book stored in the terminal. Also, the controller 190 may collect the event information stored in the scheduler application=at the time the image contents are captured and stored, and retrieves the event associated with the contents.

The controller 190 may generate the context tag information based on the collected context information (240). The context tag information may generate at least one of a position tag using the position information, a date tag using the date information, a weather tag using the weather information, a member tag using the member information, and an event tag using the event information.

The controller 190 may store the contents and the context tag information by relating each other in the storing unit (250).

Figure 3:
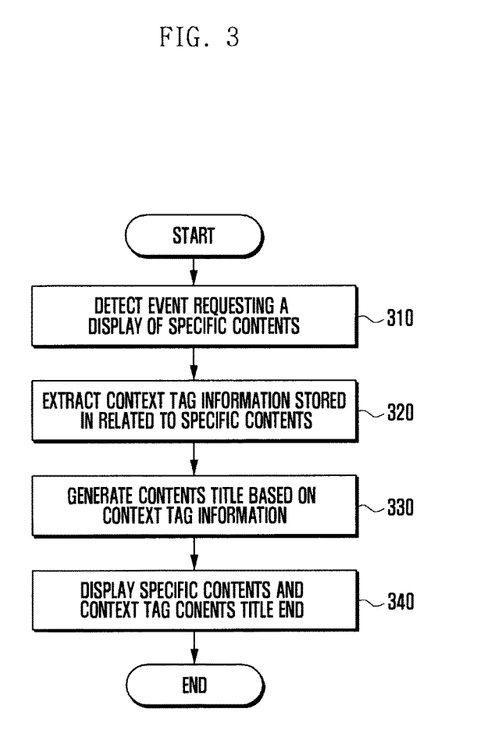
FIG. 3 is a flow chart illustrating a title display method of a portable terminal according to the present invention.

FIG. 3 is a flowchart illustrating the title display method of the portable terminal according to the present invention.

Referring to FIG. 3, the controller 190 may detect an event requesting for a display of a specific content (310). The controller 190 may extract the stored context tag information relating to the requested specific contents (320). For example, when the event requesting for the contents display for a specific member photo is detected, the controller 190 may extract at least one of the position tag, the weather tag, the data tag, the member tag, and the event tag stored in a database which were generated at the time of generation of the specific member photo.

The controller 190 may generate the content title based on the context tag information (330). Alternatively, the controller 190 may generate the content title by inputting it directly in the user interface displayed on the display unit or by further adjusting the user interface to change the generated content title. Alternatively, the controller 190 may generate the content title by configuring the content title differently according the user's preference using the context tag information or based on one of predefined title formats.

The controller 190 may display the generated content title and the specific contents on the display panel (340). The controller 190 may provide the content title generated on the display panel. More specifically, the controller 190 may display the content title as superimposed on the displayed contents. Further, the controller 190 may provide and display the content title generated by matching the input fields on the contents display screen based on the context tag information.

Figure 4:
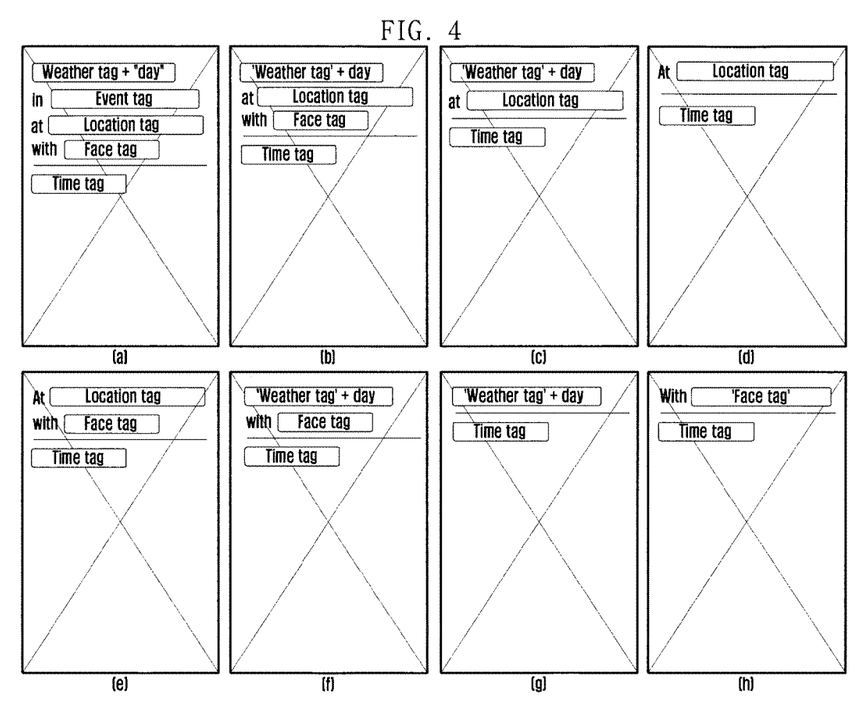
FIG. 4 is an example view explaining a title generation process of a portable terminal according to an exemplary embodiment of the present invention.

FIG. 4 is a drawing for illustrating the process of providing a content title in the portable terminal according to an exemplary embodiment of the present invention.

Referring to FIG. 4, in the content title providing screens such as FIGS. 4(a) to 4(h) of the present invention, the content title may be configured differently according to the availability of context tag information. For example, the content title providing screen may be configured as illustrated in FIG. 4(a) when the weather tag, the event tag, the position tag, the member tag, and the time tag are collected and stored in a storage unit. The content title providing screen may be configured differently such as the case in which the event tag is not available (FIG. 4b), the case in which the event tag and the member tag are not available (FIG. 4c), and the case in which the weather tag, the member tag and the event tag are not available (FIG. 4d). Further, as illustrated on the screens of FIG. 4 e,f,g,h, the content title may be configured differently based on the availability of the context tag information collected and stored.

Moreover, the portable terminal of the present invention may further provide the title editing menu which is able to configure a size, a shape, a color, and a position according to the user's preference. Further, the title providing rule may be designed and predefined at the time of manufacturing the portable terminal, however, is not limited thereto.

Figure 5:
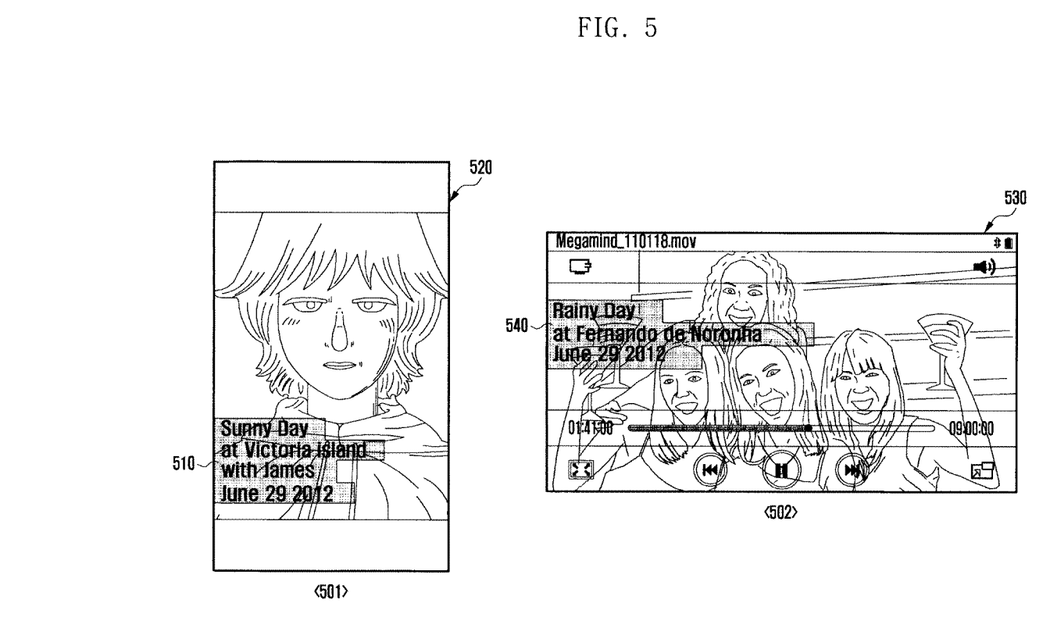
FIG. 5 is an example view displaying to provide a title of contents according to an exemplary embodiment of the present invention.

FIG. 5 is a drawing for explaining the display screen of the contents and its content title in the portable terminal of the present invention.

Referring to FIG. 5, the portable terminal of the present invention may display the content display screen 520 together with the contents and the content title. In other words, the contents displaying on the display panel may be displayed together with the content title based on the context tag information collected or stored in the corresponding displayed contents.

A screen 501 shows the display screen of photo contents 520, and the screen 502 shows the display screen of the video contents 530.

In detail, the photo content title 510 based on the weather tag, the position tag, the member tag, and the date tag may be displayed on the photograph display screen 520. Here, the location, date, time and person information can be collected by the terminal as discussed earlier. The location information can be collected using a GPS system, and the date and time can be retrieved from the base station. The person can be recognized and compared with a pre-stored database for identification. Alternatively, all the information can be entered by the mobile user. During a subsequent replay of the image 520 displayed on screen, the user may check that the member imprinted in the photo is 'james' and may check that the photo was taken in 'victoria island' in 'sunny weather' on '2012.6.29.

The video contents title 540 based on the weather tag, the position tag, and the date tag may be displayed on the video contents display screen 530. Similarly, these information were collected or entered by the terminal, and superimposed over the video content, so that during a replay, the mobile user may check that the video was taken in 'rainy day' on 2012.6.29' at 'fernande de norohna' through the contents title.

As described above, the content display screen may display the contents together with the corresponding content title indicating the context information at the time of contents generating.

Figure 6:
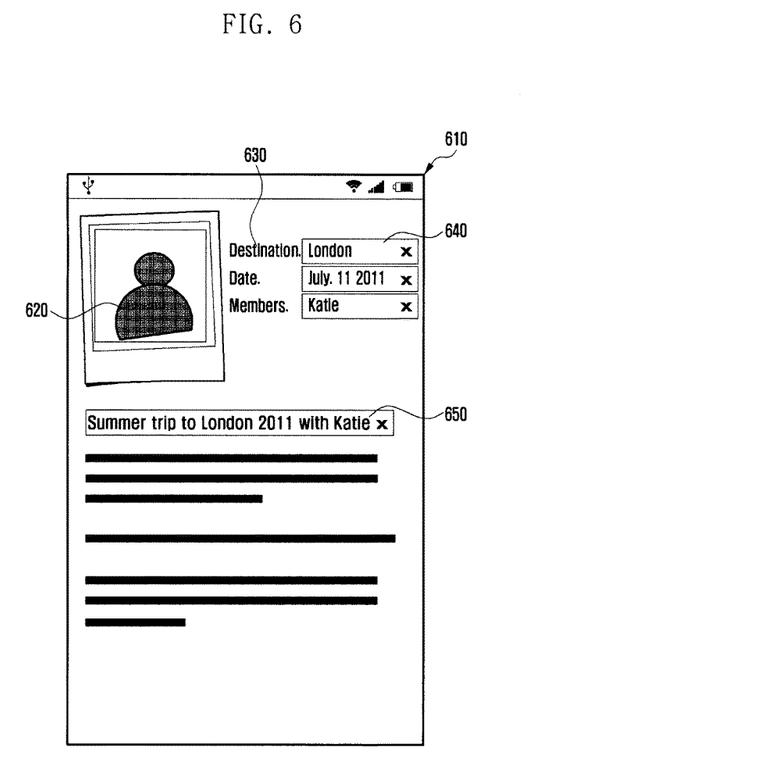
FIG. 6 is an example view providing a title of contents according to a first exemplary embodiment of the present invention.

FIG. 6 is a drawing illustrating the travel application contents screen according to a first exemplary embodiment of the present invention.

Referring to FIG. 6, the display panel may display a travel template contents screen 610 under the control of the controller 190. The travel template contents screen 610 may include an input field such as an image field 620, a destination field 640, a data field, a member field, a title field 650, and a description field, however, is not limited thereto.

While the travel template contents screen 610 is displayed, the user may perform an input of selecting a specific image content in the image field 620. Then, the controller 190 may display the title information which matches to the corresponding fields based on the context tag information stored relating to the image contents.

In other words, the position tag stored relating to the selected image contents is displayed on the destination field of the travel template contents screen 610, the date tag is displayed on the date field, and the member tag matching to the member information may be displayed on the member field. As a result, the content title based on the weather information, the position information and the member information may be displayed on the title field for display.

Figure 7:
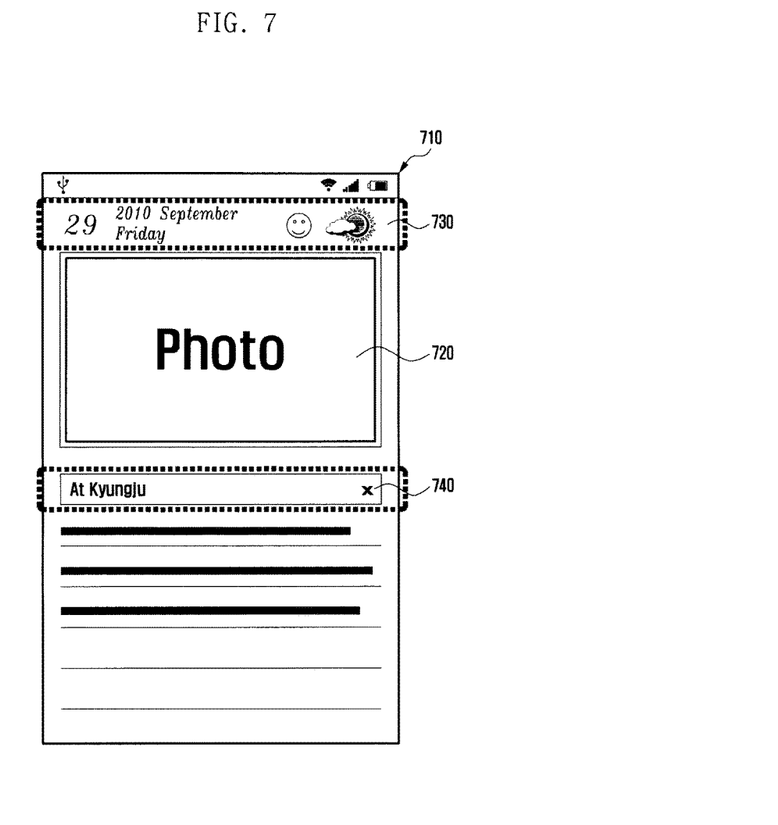
FIG. 7 is an example view providing a title of contents according to a second exemplary embodiment of the present invention.

FIG. 7 is an example view providing the content title of the portable terminal according to the second exemplary embodiment of the present invention.

Referring to FIG. 7, the display panel may display the diary template contents screen 710 under the control of the controller 190. The input field such as the date and the weather field, the photo field, the position field, and the description field may be included to the diary template contents screen 710, however, is not limited thereto.

While the diary template contents screen 710 is displayed, the user may perform an input or a request of selecting and displaying a specific image content to the image field 720. Then, the controller may display the information which matches the displayed image based on the stored context tag information associated with the specific image, and then generate information including the date and the weather field, and the position field.

In other words, the date and the weather tag information stored relating to the selected image contents may be displayed on the respective date and weather field of the diary template contents screen 710, and the position tag information stored relating to the selected image contents may be displayed on the position field. Here, the user may be further provided with a user interface to further change the format of the displayed contents and the content title.

Figure 8:
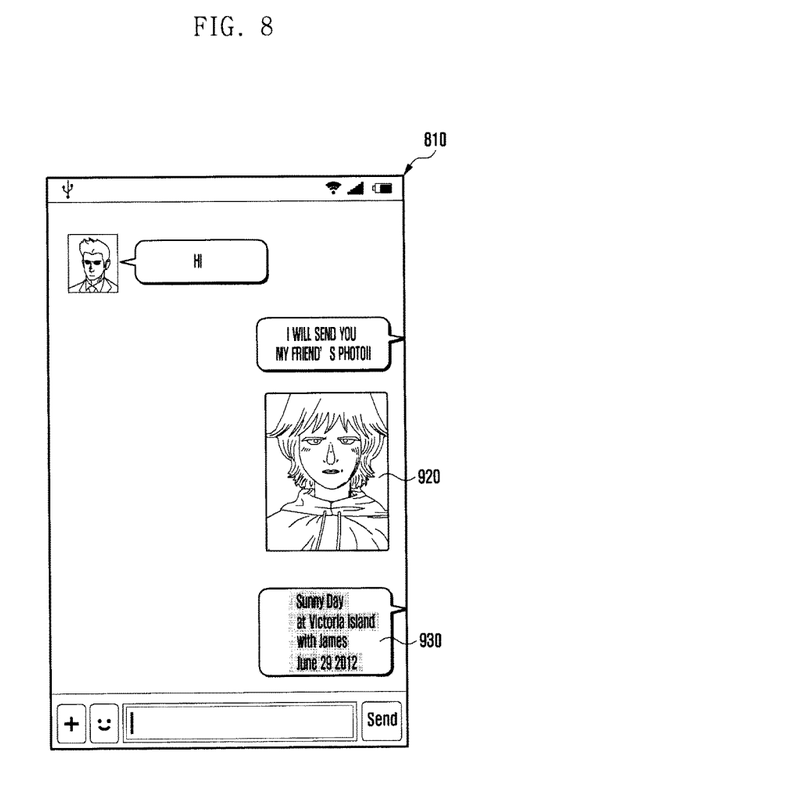
FIG. 8 is an example view providing a title of contents according to a third exemplary embodiment of the present invention.

FIG. 8 is an example view providing the content title of the portable terminal according to a third exemplary embodiment of the present invention.

Referring to FIG. 8, the display panel may display the execution screen of a messenger application 810. The user may transmit the specific contents, for example, the image contents 920 to other user from the messenger application. Then, the controller 190 may transmit the generated content and the content title 930 in sequence based on the stored context information corresponding the displayed image contents.

The messenger application is described in the present invention, however, the content title may be provided together with any other shared contents during different applications using the portable terminal.

According to the present invention, a method and an apparatus for generating a content title by collecting a context tag information using a communication device when the contents are generated or displayed, and then storing the contents with the related context tag information. During a subsequently replay, when a particular content is displayed, the related context tag information is retrieved to generate a content title in a predetermined format. As a result, the user is able to see the context of the contents easily based on the displayed context tag information in the content title.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for providing a content title in a portable terminal having a display, the method comprising;
   determining by a processor whether event information is stored in memory, the event information including at least one of a time and a position indicating when and where a particular event is generated;
   collecting the event information if the event information is stored in memory;
   retrieving an event tag corresponding to the collected event information, and context tag information indicating the time at which particular content is generated;
   generating the content title according to a predetermined format including at least display of the retrieved event tag and the retrieved context tag information;
   displaying on a display the content title including the retrieved event tag and the retrieved context tag information indicating the time at which the particular content is generated overlaying the particular content; and
   in response to detecting an input requesting transmission of the particular content, transmitting the particular content to an external device as a first message and transmitting the generated content title to the external device as a second message separate from the first message, the generated content title of the second message including display of the time and the position arranged according to the predetermined format.

2. The method of claim 1, further comprising:
collecting at least one context information related to the particular content;
generating the context tag information based on the at least one context information; and
storing the generated context tag information for a subsequent retrieval,
wherein the time indicated by the retrieved context tag information and overlaid on the particular content includes at least an indication of a year.

3. The method of claim 1, wherein the first message including the particular content and the second message including the generated content title are disposed sequentially adjacent to one another within a list of messages displayed on the display after transmission of the first message and the second message to the external device.

4. The method of claim 1, wherein the particular content and the content title are displayed in sequence during a messenger application mode.

5. The method of claim 1, wherein the predetermined format comprises a plurality of input fields matching the retrieved context tag information.

6. The method of claim 5, wherein the input field comprises at least one of a position information field, a date information field, a member information field, a title information field, and a weather information field.

7. The method of claim 1, wherein displaying the content title and the particular content comprises superimposing the contents title on a particular portion of the particular content.

8. The method of claim 1, wherein the retrieved context tag information corresponding to the displayed particular content is pre-stored in memory.

9. The method of claim 1, wherein retrieving the context tag information comprises:
recognizing at least one face in the displayed particular content;
retrieving a facial tag information of the recognized face from memory; and
displaying the content title including the retrieved facial tag information.

10. The method of claim 1, further comprising displaying a screen interface for further manipulating the displayed content title.

11. A portable terminal providing a contents title comprising:
a touch screen for displaying a particular content; and
a processor configured to:
determine whether event information is stored in memory, the event information including at least one of a time and a position indicating when and where the particular content is generated,
collect the event information if the event information is stored in memory,
retrieve an event tag corresponding to the collected event information, and context tag information indicating the time at which the particular content is generated,
generate a content title according to a predetermined format including at least display of the retrieved event tag and the retrieved context tag information,
display on the touch screen the generated content title including the retrieved event tag and the retrieved context tag information indicating the time at which the particular content is generated overlaying the particular content, and
in response to detecting an input request transmission of the particular content, transmit the particular content to an external device as a first message and transmitting the generated content title to the external device as a second message separate from the first message, the generated content title of the second message including display of the time and the position arranged according to the predetermined format.

12. The portable terminal of claim 11, wherein the context tag information comprises at least one of a position tag, a date tag, a weather tag, and a member tag, and
wherein the time indicated by the retrieved context tag information and overlaid on the particular content includes at least an indication of a year.

13. The portable terminal of claim 11, wherein the first message including the particular content and the second message including the generated content title are disposed sequentially adjacent to one another within a list of messages displayed on the display after transmission of the first message and the second message to the external device.

14. The portable terminal of claim 11, wherein memory stores the displayed content title and the particular content for a subsequent replay.

15. The portable terminal of claim 11, wherein the predetermined format comprises a plurality of input fields matching the generated context tag information.

16. The portable terminal of claim 15, wherein the input field includes at least one of a position information field, a date information field, a member information field, a title information field, and a weather information field.

17. The portable terminal of claim 11, wherein the processor is further configured to retrieve the generated context tag information from memory.

18. The portable terminal of claim 11, wherein the processor is further configured to: generate the context tag information by: recognizing at least one face in the displayed particular content; and retrieve facial tag information of the recognized face from memory; and display the content title including the retrieved facial tag information.

19. The portable terminal of claim 11, wherein the processor is configured to control the touch screen to display a screen interface for further manipulating the displayed content title.

* * * * *